(12) United States Patent
Ishii

(10) Patent No.: US 8,860,054 B2
(45) Date of Patent: Oct. 14, 2014

(54) ELECTROOPTICAL DEVICE AND ELECTRONIC APPARATUS

(75) Inventor: Tatsuya Ishii, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 36 days.

(21) Appl. No.: 12/966,414

(22) Filed: Dec. 13, 2010

(65) Prior Publication Data

US 2011/0140155 A1 Jun. 16, 2011

(30) Foreign Application Priority Data

Dec. 16, 2009 (JP) ................................. 2009-285306

(51) Int. Cl.
*H01L 33/00* (2010.01)
*G02F 1/1362* (2006.01)

(52) U.S. Cl.
CPC .... *G02F 1/136209* (2013.01); *G02F 1/136277* (2013.01)
USPC .................................. 257/98; 257/E33.067

(58) Field of Classification Search
USPC ......... 362/619, 626, 620; 216/23, 24; 257/72, 257/E33.067, E33.072; 349/62
See application file for complete search history.

(56) References Cited

U.S. PATENT DOCUMENTS

| | | | | |
|---|---|---|---|---|
| 5,151,801 A | * | 9/1992 | Hiroshima | 349/95 |
| 5,317,432 A | * | 5/1994 | Ino | 349/39 |
| 5,581,379 A | * | 12/1996 | Aoyama et al. | 349/5 |
| 5,764,318 A | * | 6/1998 | Kurematsu et al. | 349/5 |
| 5,808,712 A | * | 9/1998 | Hishida et al. | 349/95 |
| 6,762,809 B1 | * | 7/2004 | Murade | 349/110 |
| 7,420,638 B2 | * | 9/2008 | Tasaka et al. | 349/123 |
| 7,952,661 B2 | * | 5/2011 | Satoh | 349/113 |
| 2002/0145683 A1 | * | 10/2002 | Murade et al. | 349/43 |
| 2006/0208284 A1 | * | 9/2006 | Kaise et al. | 257/232 |
| 2006/0250548 A1 | * | 11/2006 | Yasukawa | 349/113 |
| 2007/0099396 A1 | * | 5/2007 | Hirai et al. | 438/460 |
| 2007/0165147 A1 | * | 7/2007 | Kamijima et al. | 349/38 |
| 2007/0183016 A1 | * | 8/2007 | Kamijima et al. | 359/245 |
| 2007/0200975 A1 | * | 8/2007 | Kamijima | 349/95 |
| 2008/0055500 A1 | * | 3/2008 | Maeda | 349/15 |
| 2008/0100784 A1 | * | 5/2008 | Haruyama | 349/114 |
| 2010/0079715 A1 | * | 4/2010 | Iki | 349/139 |

FOREIGN PATENT DOCUMENTS

| | | | |
|---|---|---|---|
| JP | 2007219050 A | | 8/2007 |
| JP | 2007249183 A | * | 9/2007 |
| JP | 2008008939 A | | 1/2008 |
| JP | 2009198762 A | | 9/2009 |
| JP | 2009204649 A | | 9/2009 |

OTHER PUBLICATIONS

English translation of JP2009198762.*
English translation of Yamazaki, JP2009-198762 , pub date. Sep. 2009.*

* cited by examiner

Primary Examiner — Daniel Luke
Assistant Examiner — Latanya N Crawford
(74) Attorney, Agent, or Firm — Lowe Hauptman & Ham, LLP

(57) ABSTRACT

An electrooptical device includes a substrate, a pixel electrode which is provided on the substrate, a semiconductor element which is provided so as to correspond to the pixel electrode, and a light reflection portion formed with a groove formed on at least a part of the substrate. In the electrooptical device, the semiconductor element is arranged so as to overlap with the light reflection portion in plan view and is arranged on a flattened film provided so as to cover at least an opening of the groove.

12 Claims, 8 Drawing Sheets

INCIDENT LIGHT

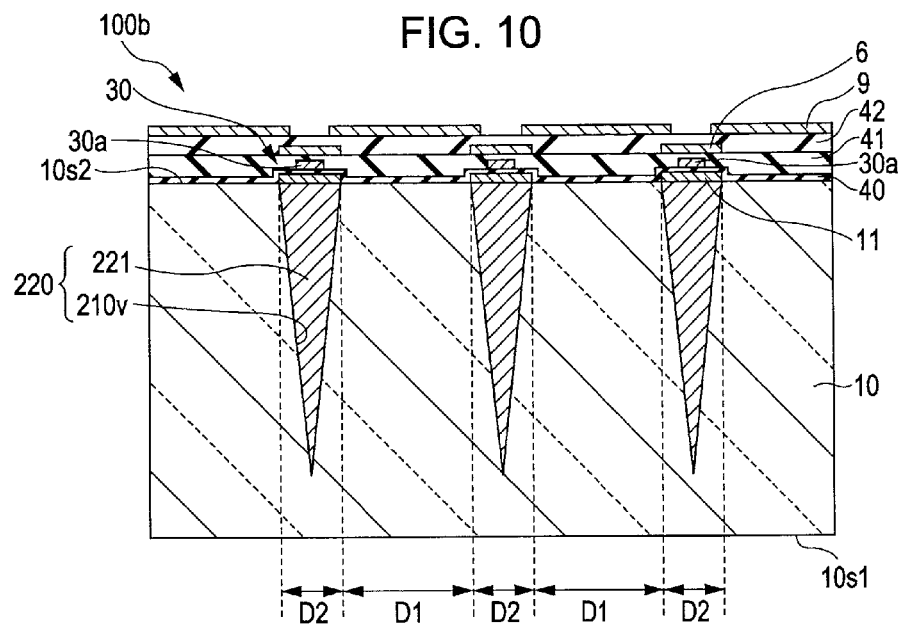
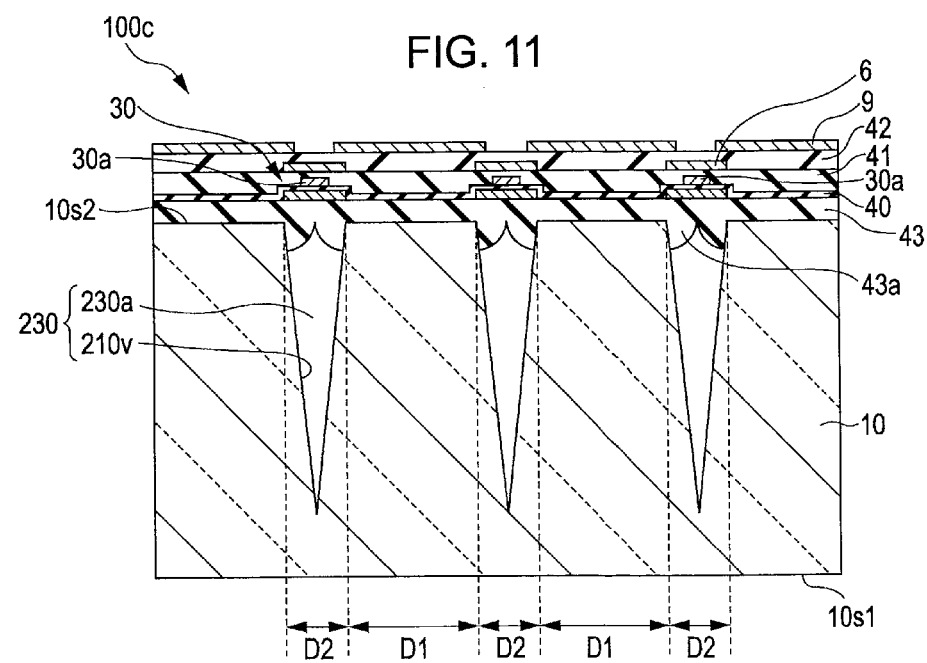

ELECTROOPTICAL DEVICE AND ELECTRONIC APPARATUS

BACKGROUND

1. Technical Field

The present invention relates to an electrooptical device such as a liquid crystal device, and an electronic apparatus including the electrooptical device, such as a liquid crystal projector.

2. Related Art

As an electrooptical device of this type, there is a liquid crystal device in which a liquid crystal as an electrooptic substance is sandwiched between a TFT array substrate and a counter substrate. A pixel electrode and a pixel switching thin film transistor (TFT) are formed on the TFT array substrate. A counter electrode is formed on the counter substrate. In such a liquid crystal device, a prism corresponding to each pixel is created on the counter substrate in some case in order to enhance utilization efficiency of incident light which is incident from a side of the counter substrate (see, JP-A-2009-204649, for example).

On the other hand, a following technique is disclosed in JP-A-2009-198762, for example. That is, a groove is formed on a TFT array substrate, a reflection film is formed on a slope of the groove and a pixel switching TFT is arranged in the groove. Therefore, light transmittance at a pixel and a light shielding property with respect to the pixel switching TFT are enhanced.

However, with the technique disclosed in JPA-2009-204649, the prism is formed on the counter substrate. Therefore, when the TFT array substrate and the counter substrate are bonded to each other with a sealing material, for example, in a manufacturing process, there arises a technical problem that relative positional deviation is caused between these substrates (that is, relative positional deviation is caused between the TFT array substrate and the counter substrate). If such positional deviation is caused, an opening region of each pixel (that is, a region where light contributing to display is output for each pixel) is made to be narrower due to the prism, resulting in deterioration in light transmittance at each pixel.

Further, with the technique disclosed in JP-A-2009-198762, if the groove is formed to be relatively large for arranging the pixel switching TFT in the groove, an opening region at each pixel is made to be narrower by the groove. Therefore, there arises a technical problem of causing a risk that light transmittance at each pixel is deteriorated.

SUMMARY

An advantage of some aspects of the invention is to provide an electrooptical device which can enhance light transmittance at each pixel and can display a luminous image with high definition, and an electronic apparatus including the electrooptical device.

An electrooptical device according to a first aspect of the invention includes an element substrate, a pixel electrode which is provided on the element substrate, a semiconductor element which is provided so as to correspond to the pixel electrode, and a light reflection portion formed with a groove formed on at least a part of the element substrate. In the electrooptical device, the semiconductor element is arranged so as to overlap with the light reflection portion when seen from above on the element substrate and is arranged on a flattened film so as to cover at least an opening of the groove.

The electrooptical device according to the aspect of the invention is formed by sandwiching an electrooptical substance such as a liquid crystal or the like between an element substrate and a counter substrate. A pixel electrode and a semiconductor element such as a pixel switching TFT which is electrically connected to the pixel electrode are provided on the element substrate. A counter electrode opposed to the pixel electrode is provided on the counter substrate. When the electrooptical device is operated, an image signal is selectively supplied to the pixel electrode so as to display an image on a pixel region (or an image display region) on which a plurality of pixel electrodes are arranged. It is to be noted that the image signal is supplied to the pixel electrode through the semiconductor element from the data line, for example, at a predetermined timing by turning ON/OFF the semiconductor element as the pixel switching TFT which is electrically connected between the data line and the pixel electrode, for example.

In the electrooptical device according to the aspect of the invention, light is incident onto one substrate surface of the element substrate; the pixel electrode and the semiconductor element are provided on the other substrate surface of the element substrate, which is different from one substrate surface, for example. When an image is displayed, light incident from a light source onto the electrooptical substance such as the liquid crystal which is sandwiched between the element substrate and the counter substrate is incident not from a side of the counter substrate but from a side of the element substrate. For example, the light is transmitted through the electrooptical substance such as the liquid crystal depending on an orientation state so as to be output from the side of the counter substrate as a display light.

Particularly in the aspect of the invention, a light reflection portion is formed on the element substrate. The light reflection portion is formed by digging a V-shaped groove on at least a part of the element substrate. The light reflection portion is provided at a part of a non-opening region on the other substrate surface of the element substrate, for example. The light reflection portion typically has a vacuum layer, an air layer, a metal layer, an insulation layer, or the like in the groove, for example.

Therefore, for example, light which is incident onto the non-opening region from one substrate surface side of the element substrate can be reflected by the light reflection portion so as to travel to the opening region. It is to be noted that an expression "opening region" indicates a region where light contributing to display is output for each pixel in a pixel region (in other words, a region where an electrooptical operation by the electrooptical substance is practically performed in the pixel region). An expression "non-opening region" indicates a region excluding the opening region in the pixel region, for example. That is, the "non-opening region" indicates a region where light contributing to display is not output for each pixel in the pixel region (in other words, a region where an electrooptical operation by the electrooptical substance is not practically performed in the pixel region). With the light reflection portion, for example, light which is incident from one substrate surface side of the element substrate can be reflected on an interface between the light reflection portion and the element substrate so as to travel to the opening region of each pixel.

Accordingly, utilization efficiency (in other words, light transmittance at each pixel) of light incident from a light source can be enhanced by the light reflection portion.

Further, particularly in the aspect of the invention, the semiconductor element is arranged so as to overlap with the light reflection portion when seen from above on the element substrate and is arranged on a flattened film provided so as to cover at least an opening of the groove. Therefore, light toward the semiconductor element from one substrate surface side of the element substrate can be blocked by the light reflection portion. That is, a light shielding property with respect to the semiconductor element can be enhanced by the light reflection portion. Accordingly, a light leakage current of the semiconductor element, which is the pixel switching TFT, for example, can be reduced and a contrast ratio of the display image can be improved. In addition, the semiconductor element is arranged on the flattened film and is not arranged in the groove constituting the light reflection portion formed on the element substrate. Therefore, the opening region of each pixel can be suppressed from being narrower by the groove in comparison with a case where the semiconductor element is arranged in the groove formed on the element substrate, for example. Accordingly, light transmittance at each pixel can be enhanced.

As described above, with the electrooptical device according to the aspect of the invention, light transmittance at each pixel and a light shielding property with respect to the semiconductor element can be enhanced. As a result, a luminous image with high definition can be displayed.

According to another aspect of the electrooptical device, it is preferable that the flattened film be formed filling at least a part of the groove.

According to the aspect of the invention, the semiconductor element is formed on the flattened film formed by filling at least a part of the groove. Therefore, element characteristics of the semiconductor element can be suppressed or prevented from changing by the light reflection portion. Further, the semiconductor element can be arranged so as to overlap with the light reflection portion by filling at least a part of the groove with the flattened film.

According to another aspect of the electrooptical device, it is preferable that the light reflection portion have an air layer in the groove.

According to the aspect of the invention, light incident from one substrate surface side of the element substrate can be reliably reflected on an interface between the air layer of the light reflection portion and the element substrate so as to travel to the opening region of each pixel. Further, with this configuration, the manufacturing process can be simplified in comparison with a case where the groove of the light reflection portion is filled with a reflective material such as a metal, for example.

An angle of the V-shaped groove (reflection portion, prism) is determined such that an incident angle of light is equal to or larger than a critical angle. The angle of the V-shaped groove is determined in such a manner in order to cause "total reflection" on the interface between the element substrate and the air layer. The angle is determined by a width of the non-opening region, that is, a length of a base of the prism, and a depth of the prism. The V-shaped angle is designed to satisfy the above condition so that the air layer functions as the light reflection portion.

According to another aspect of the electrooptical device, it is preferable that the light reflection portion have a vacuum layer in the groove.

According to the aspect of the invention, light incident from one substrate surface side of the element substrate can be reliably reflected on an interface between the vacuum layer of the light reflection portion and the element substrate so as to travel to the opening region of each pixel. Further, the manufacturing process can be simplified in comparison with a case where the groove of the light reflection portion is filled with a reflective material such as a metal, for example.

In this case, as in the case of the air layer, an angle of the V-shaped groove (which is determined by a width of the non-opening region, that is, a length of a base of the prism, and a depth of the prism) is determined such that an incident angle of light is equal to or larger than a critical angle. The angle of the V-shaped groove is also determined in such a manner in order to cause "total reflection" on the interface between the element substrate and the vacuum layer. The V-shaped angle is designed to satisfy the above condition so that the vacuum layer functions as the light reflection portion.

According to another aspect of the electrooptical device, it is preferable that the light reflection portion have a metal layer in the groove.

According to the aspect of the invention, light incident from one substrate surface side of the element substrate can be reliably reflected on an interface between the metal layer of the light reflection portion and the element substrate so as to travel to the opening region of each pixel. Further, leakage of air from the groove due to the change in ambient atmospheric pressure can be reduced. For example, the leakage of air may be caused in the manufacturing process when the light reflection portion has an air layer in the groove. Accordingly, the reliability of the device can be enhanced.

According to another aspect of the electrooptical device, it is preferable that a counter substrate which is arranged so as to be opposed to the element substrate be provided and a light shielding film be not provided on the counter substrate at a position corresponding to an area between the pixel electrodes which are adjacent to each other on the element substrate.

According to the aspect of the invention, reduction in an aperture ratio due to relative positional deviation between the element substrate and the counter substrate can be prevented.

Effects and other advantages of the invention will be made obvious through the embodiments of the invention which will be described later.

BRIEF DESCRIPTION OF THE DRAWINGS

The invention will be described with reference to the accompanying drawings, wherein like numbers reference like elements.

FIG. 10 is a cross-sectional view illustrating configurations of a plurality of pixel portions which are adjacent to each other in a liquid crystal device according to a second embodiment.

FIG. 11 is a cross-sectional view illustrating configurations of a plurality of pixel portions which are adjacent to each other in a liquid crystal device according to a third embodiment.

DESCRIPTION OF EXEMPLARY EMBODIMENTS

Hereinafter, embodiments of the invention will be described with reference to drawings. In the following embodiments, a TFT active matrix driving-type liquid crystal device with a built-in driving circuit is described. The TFT active matrix driving-type liquid crystal device is an example of an electrooptical device according to the invention.

First Embodiment

A liquid crystal device according to the first embodiment is described with reference to FIG. 1 through FIG. 9.

At first, an entire configuration of the liquid crystal device according to the embodiment is described with reference to FIG. 1 and FIG. 2.

Figure 1:
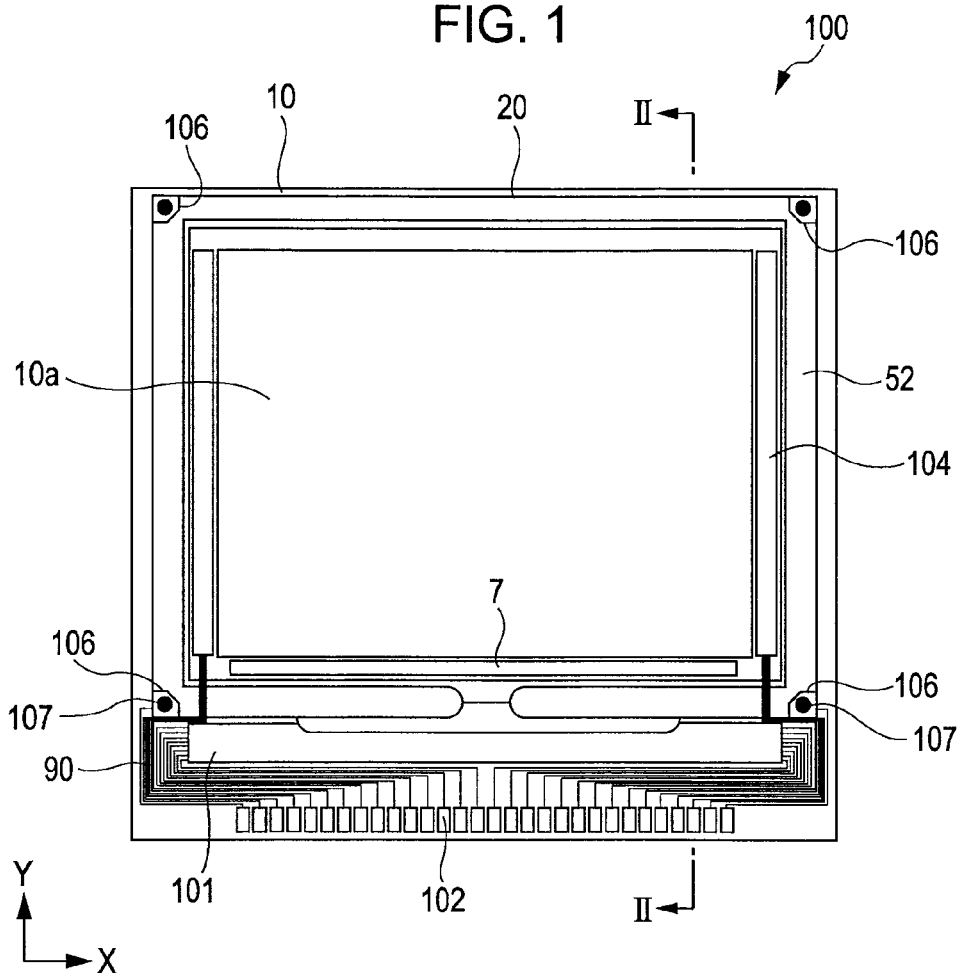
FIG. 1 is a plan view illustrating an entire configuration of a liquid crystal device according to a first embodiment.

FIG. 1 is a plan view illustrating a configuration of the liquid crystal device according to the embodiment. FIG. 2 is a cross-sectional view cut along a line II-II in FIG. 1.

Figure 2:
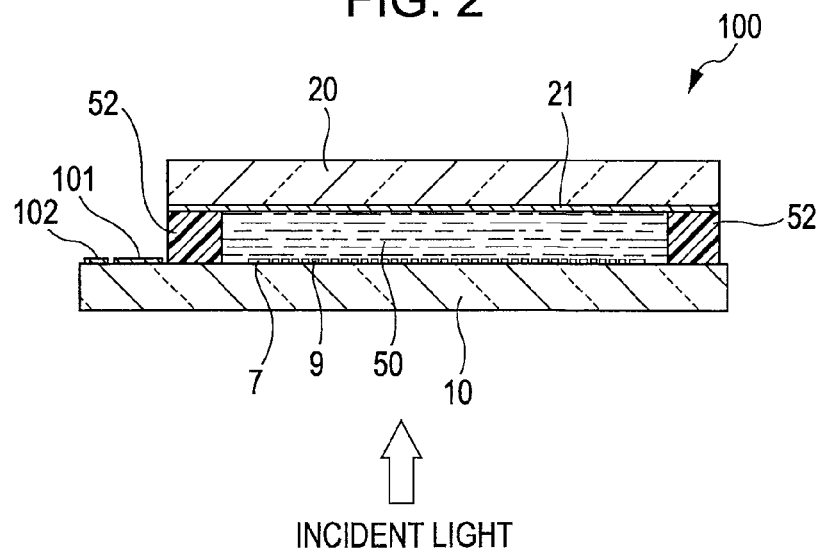
FIG. 2 is a cross-sectional view cut along a line II-II in FIG. 1.

In FIG. 1 and FIG. 2, in a liquid crystal device 100 according to the first embodiment, a TFT array substrate 10 as an example of "element substrate" according to the invention and a counter substrate 20 are arranged so as to be opposed to each other. Each of the TFT array substrate 10 and the counter substrate 20 is made of a glass, or a quartz substrate, for example. A liquid crystal layer 50 is sealed between the TFT array substrate 10 and the counter substrate 20. Further, the TFT array substrate 10 and the counter substrate 20 are bonded to each other with a sealing material 52. The sealing material 52 is provided at a sealing region around an image display region 10a, and made of a photocurable resin, a thermosetting resin, or the like, for example.

In FIG. 1, a data line driving circuit 101 and external circuit connecting terminals 102 are provided on a peripheral region along one side of the TFT array substrate 10. At this time, the data line driving circuit 101 and the external circuit connecting terminals 102 are provided at an outer side of the sealing region on which the sealing material 52 is arranged. A sampling circuit 7 is provided at an inner side of the sealing region along one side of the TFT array substrate 10. Further, scanning line driving circuits 104 are provided at an inner side of the sealing region along two sides each of which is adjacent to the one side. Further, vertical conductive terminals 106 are arranged on the TFT array substrate 10 at regions opposed to four corner portions of the counter substrate 20. The vertical conductive terminals 106 connect the TFT array substrate 10 and the counter substrate 20 with vertical conductive materials 107. An electric conduction between the TFT array substrate 10 and the counter substrate 20 is achieved with the vertical conductive terminals 106 and the vertical conductive materials 107.

A distribution wiring 90 is formed on the TFT array substrate 10. The distribution wiring 90 electrically connects the external circuit connecting terminals 102, the data line driving circuit 101, the scanning line driving circuits 104, the vertical conductive terminals 106, and the like.

In FIG. 2, laminated structures in which pixel switching TFTs and wirings such as scanning lines, data lines and the like are embraced are formed on the TFT array substrate 10. Pixel electrodes 9 are provided in a matrix form at an upper layer side of the pixel switching TFTs and the wirings such as the scanning lines, the data lines and the like in the image display region 10a. Each pixel electrode 9 is made of a transparent material such as indium tin oxide (ITO). An orientation film is formed on the pixel electrodes 9. On the other hand, a counter electrode 21 is formed on a surface of the counter substrate 20, which is opposed to the TFT array substrate 10. At this time, the counter electrode 21 is formed so as to be opposed to the plurality of pixel electrodes 9 in a solid form. The counter electrode 21 is made of a transparent material such as ITO. An orientation film is formed on the counter electrode 21. Further, the liquid crystal layer 50 is made of a liquid crystal of one type of a nematic liquid crystal or a liquid crystal in which several types of nematic liquid crystals are mixed. The liquid crystal layer 50 is made to be in a predetermined orientation state between a pair of the orientation films.

When the liquid crystal device 100 is operated, incident light is incident onto the liquid crystal layer 50 from the side of the TFT array substrate 10. Then, the incident light is transmitted through the liquid crystal layer 50 depending on the orientation state thereof and is output to the side of the counter substrate 20 as display light. Therefore, an image is displayed on the image display region 10a.

As will be described later with reference to FIG. 4 and FIG. 5, light reflection portions 210 are provided in non-opening regions D2 of the TFT array substrate 10 so as to enhance light transmittance at each pixel.

Although not shown in the drawings, a test circuit, a test pattern, or the like, which tests quality, defects, and the like of the liquid crystal device during the manufacturing or at the time of the shipping, may be formed on the TFT array substrate 10 in addition to the data line driving circuit 101, and the scanning line driving circuits 104.

Next, an electric configuration of a pixel portion of the liquid crystal device according to the embodiment is described with reference to FIG. 3.

Figure 3:
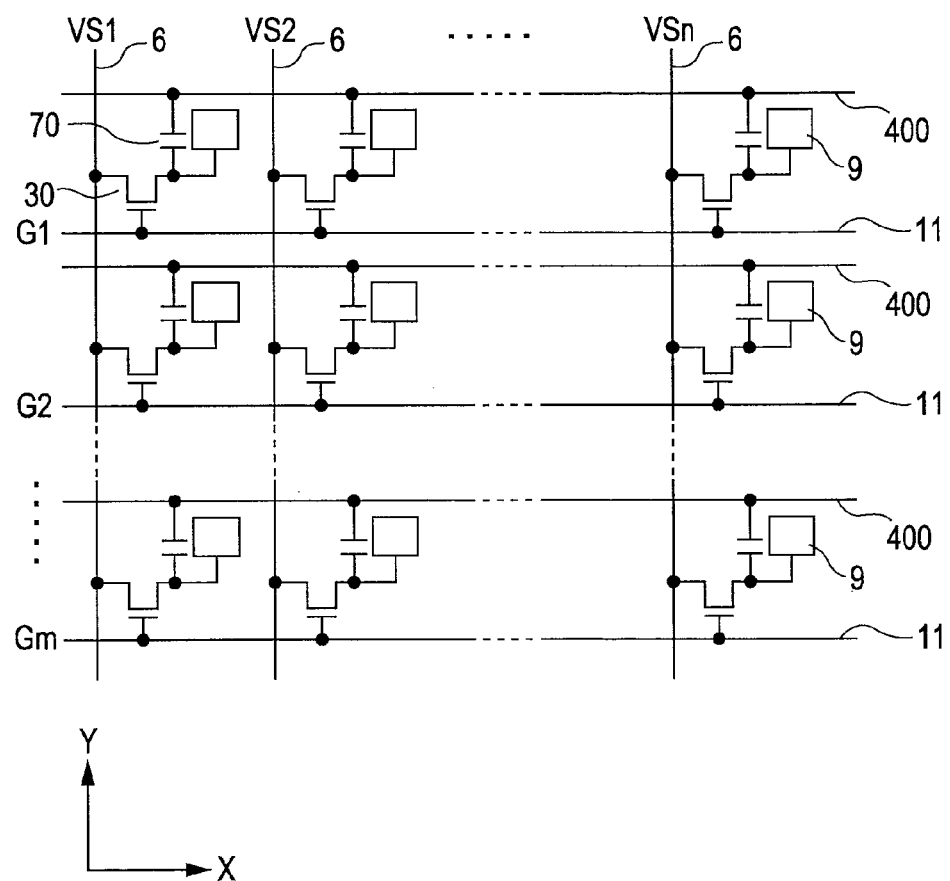
FIG. 3 is an equivalent circuit diagram illustrating a plurality of pixel portions in the liquid crystal device according to the first embodiment.

FIG. 3 is an equivalent circuit diagram illustrating various types of elements, wirings, and the like in a plurality of pixels formed into a matrix form. The plurality of pixels constitute an image display region of the liquid crystal device.

In FIG. 3, the pixel electrode 9 and a TFT 30 for controlling the switching of the pixel electrode 9 are formed at each of the plurality of pixels formed in a matrix form, which constitute the image display region 10a of the liquid crystal device 100 according to the embodiment. Data lines 6 through which image signals are supplied are electrically connected to sources of the TFTs 30. Image signals VS1, VS2, and so on up to VSn which are written into the data lines 6 may be line-sequentially supplied in this order, or may be supplied to the plurality of data lines 6 adjacent to each other in groups. It is to be noted that the TFT 30 is an example of "semiconductor element" according to the invention.

Further, scanning lines 11 are electrically connected to gates of the TFTs 30. Scanning signals G1, G2, and so on up to Gm are line-sequentially applied to the scanning lines 11 in this order at a predetermined timing as a pulse. The pixel electrodes 9 are electrically connected to drains of the TFTs 30. The image signals VS1, VS2, and so on up to VSn supplied from the data lines 6 are written at a predetermined timing by closing switches of the TFTs 30 as switching elements for a constant period of time.

The image signals VS1, VS2, and so on up to VSn at predetermined levels, which have been written into the liquid crystal through the pixel electrodes 9, are held between the liquid crystal and the counter electrode 21 (see, FIG. 2) formed on the counter substrate 20 (see, FIG. 2) for a constant period of time. The liquid crystal makes it possible to modulate light and perform gradation display by changing orientation or order of molecular aggregation depending on voltage levels to be applied. In a normally white mode, transmittance of the incident light decreases depending on the voltage to be applied to each pixel unit. In a normally black mode, transmittance of the incident light increases depending on the voltage to be applied to each pixel unit. Therefore, light having a contrast corresponding to the image signal is output as a whole from the liquid crystal device 100.

In order to prevent the held image signals from being leaked, a storage capacitor 70 is added to each pixel so as to be parallel with a liquid crystal capacitor formed between the pixel electrode 9 and the counter electrode 21. One electrode of each storage capacitor 70 is connected to the drain of each TFT 30 so as to be parallel with each pixel electrode 9. The other electrode of each storage capacitor 70 is connected to a capacitor line 400 fixed at a constant potential.

Next, a configuration of a light reflection portion, which is characteristic of the liquid crystal device according to the embodiment is described with reference to FIG. 4 and FIG. 5.

Figure 4:
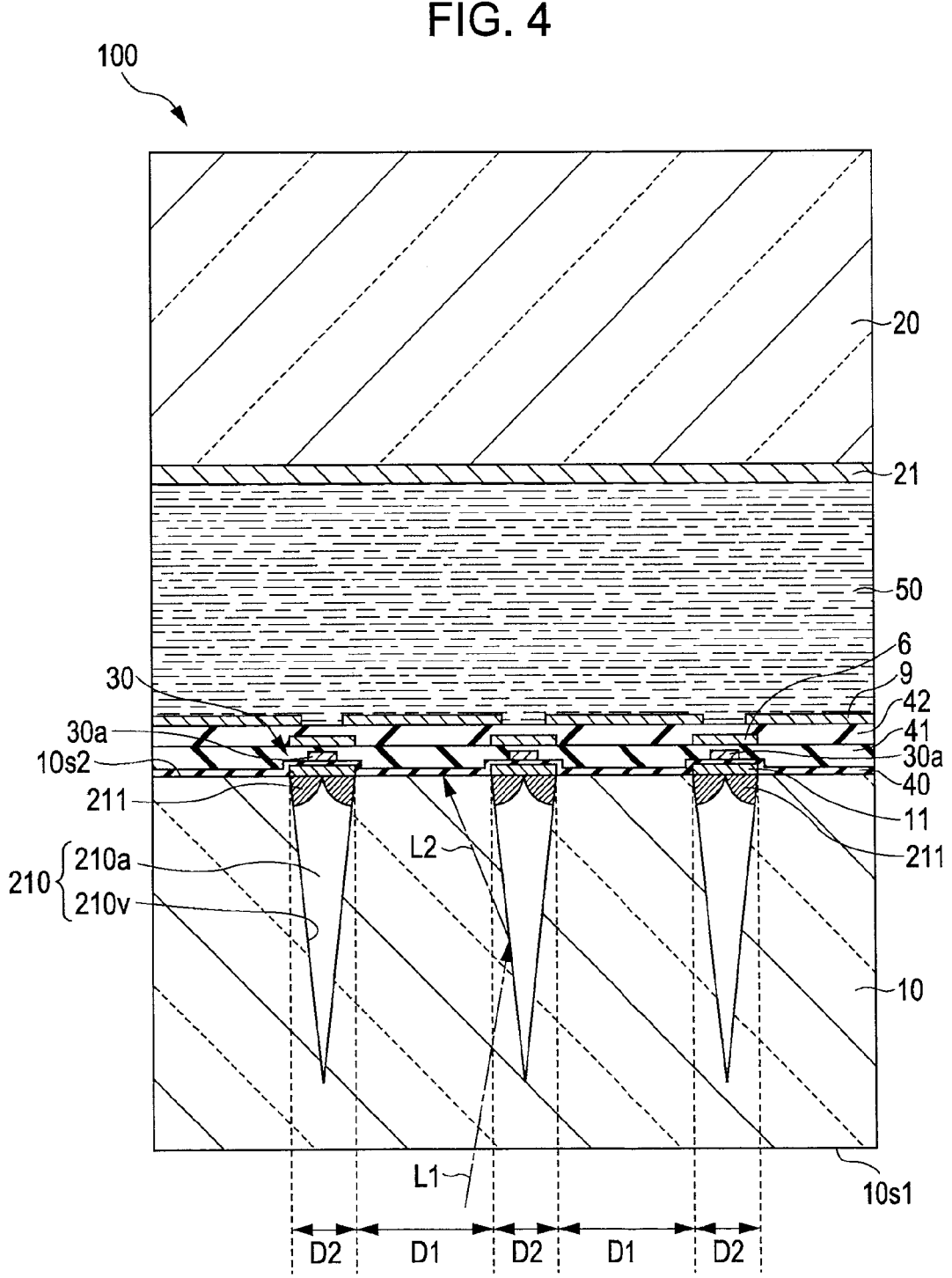
FIG. 4 is a cross-sectional view illustrating configurations of the plurality of pixel portions which are adjacent to each other in the liquid crystal device according to the first embodiment.

FIG. 4 is a cross-sectional view illustrating configurations of the plurality of pixel portions which are adjacent to each other in the liquid crystal device according to the embodiment. It is to be noted that in FIG. 4, scales are made different in each layer and each member in order to make each layer and each member to be recognizable in the drawing.

In FIG. 4, the liquid crystal device 100 according to the embodiment is formed by sandwiching the liquid crystal layer 50 between the TFT array substrate 10 and the counter substrate 20. Each circuit element of the pixel portions which have been described above with reference to FIG. 3 is established as a patterned and laminated conductive film on the TFT array substrate 10. To be more specific, the scanning lines 11, the semiconductor layers 30*a* constituting the TFTs 30, the data lines 6, and the pixel electrodes 9, which have been described above with reference to FIG. 3, are laminated in this order from a lower layer side on the TFT array substrate 10. Further, an insulation film 40 is provided between the scanning lines 11 and the semiconductor layers 30*a*. An insulation film 41 is provided between the semiconductor layers 30*a* and the data lines 6. An insulation film 42 is provided between the data lines 6 and the pixel electrodes 9. Portions of the scanning lines 11, which are opposed to channel regions of the semiconductor layers 30*a*, function as gate electrodes of the TFTs 30. The insulation film 40 functions as a gate insulation film which electrically insulates the semiconductor layer 30*a* from the gate electrode which is formed by a part of the scanning line 11. That is to say, the TFT 30 is constituted as a bottom gate-type TFT. The data lines 6 are electrically connected to source regions of the semiconductor layers 30*a* through contact holes opened in the insulation film 41. The pixel electrodes 9 are electrically connected to drain regions of the semiconductor layers 30*a* through contact holes opened in the insulation films 41, 42.

The scanning line 11, the semiconductor layer 30*a* and the data line 6 are provided at the non-opening region D2 which excludes the opening region D1 at each pixel on the TFT array substrate 10.

Figure 5:
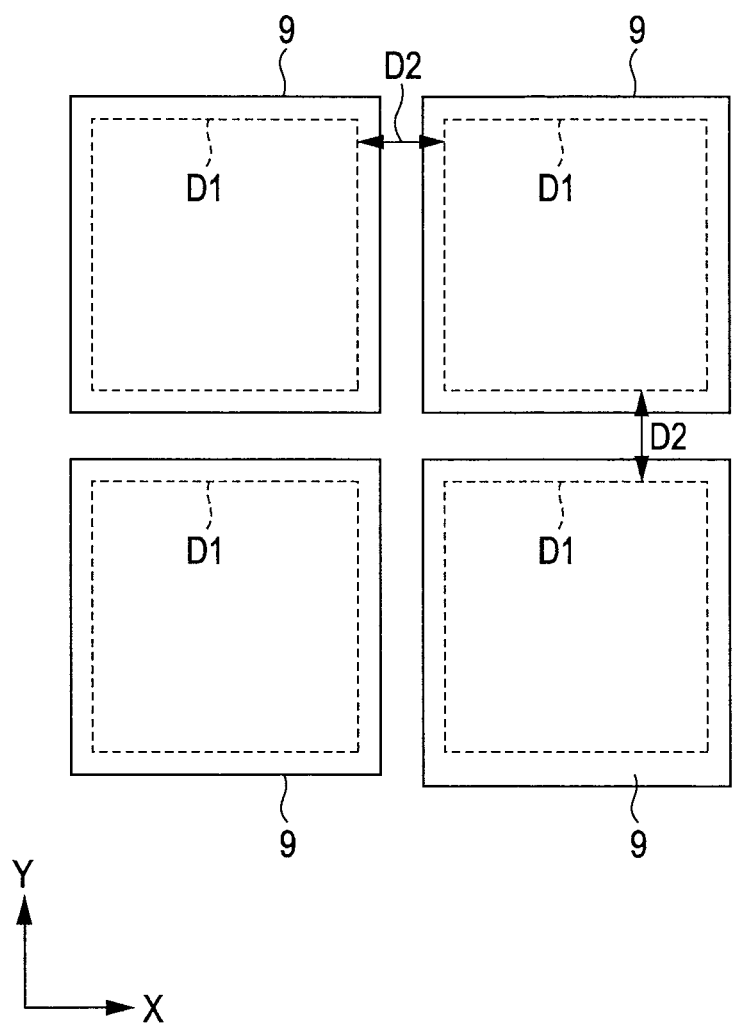
FIG. 5 is a plan view illustrating opening regions and non-opening regions of the liquid crystal device according to the first embodiment.

FIG. 5 is a plan view illustrating the opening regions and the non-opening regions of the liquid crystal device according to the embodiment.

In FIG. 4 and FIG. 5, the opening regions D1 are regions where light contributing to display is output for each pixel in the image display region 10*a* (see, FIG. 1). On the other hand, the non-opening regions D2 are regions excluding the opening regions D1 in the image display region 10*a*. That is, the non-opening regions D2 are regions where light contributing to display is not output for each pixel in the image display region 10*a*. As shown in FIG. 5, each non-opening region D2 has a grid-form planar shape so that the opening region D1 of each pixel is separated from another opening region D1.

In FIG. 4, particularly in the embodiment, the light reflection portions 210 are formed on the TFT array substrate 10. Each light reflection portion 210 is formed by digging a V-shaped groove 210*v* in the non-opening region D2 on a substrate surface 10*s*2 of the TFT array substrate 10, on which the pixel electrode 9 and the like are provided. That is, the V-shaped groove 210*v* is dug on a substrate surface of the TFT array substrate 10, which is different from a substrate surface 10*s*1 onto which incident light is incident. Each light reflection portion 210 has an air layer 210*a* in the groove 210*v*. Light shielding films 211 are provided at upper sides of the air layers 210*a* in the grooves 210*v*. The light shielding film 211 is an example of "flattened film" according to the invention. The light shielding films 211 are made of a metal material having a high melting point and a light shielding property, such as tungsten silicide (WSi), tungsten (W), or the like. The light shielding films 211 are provided so as to fill a part of each of the grooves 210*v* and the upper surface sides thereof are made to be flattened by a flattening processing such as chemical mechanical polishing (CMP). Further, each light shielding film 211 covers an opening of the groove 210*v* so as to reduce a step height between the groove 210*v* and portions where the groove 210*v* is not provided.

With the light reflection portion 210, light incident onto the non-opening region D2 from one substrate surface 10*s*1 side of the TFT array substrate 10 can be reflected on an interface between the light reflection portion 210 and the TFT array substrate 10 so as to travel to the opening region D1 of each pixel. For example, as shown in FIG. 4, light L1 incident onto the non-opening region D2 from one substrate surface 10*s*1 side of the TFT array substrate 10 is reflected by the light reflection portion 210 so as to travel to the opening region D1 as reflection light L2. Accordingly, utilization efficiency (in other words, light transmittance at each pixel) of light incident from a light source can be enhanced by the light reflection portions 210.

Further, the light reflection portions 210 are provided not at the side of the counter substrate 20 but at the side of the TFT array substrate 10. Therefore, for example, reduction in an aperture ratio (that is, a ratio of the opening region D1 with respect to the entire region at each pixel) due to relative positional deviation between the TFT array substrate 10 and the counter substrate 20 can be prevented. The relative positional deviation may be caused if the light reflection portions 210 are provided at the side of the counter substrate 20. That is, in the TFT array substrate 10, light shielding films for blocking light incident onto the TFTs 30 are required in order to prevent the deterioration in display image quality due to light leakage of the TFTs 30. If the light reflection portions 210 are provided at the side of the counter substrate 20, positioning between the TFT array substrate 10 and the counter substrate 20 has to be performed strictly. By providing the light reflection portions 210 on the TFT array substrate 10, troublesome work for the positioning between the substrates can be reduced. Therefore, with the liquid crystal device 100 according to the embodiment, light transmittance at each pixel can be reliably enhanced by the light reflection portions 210.

It is to be noted that in the embodiment, neither of the light reflection portion 210 or a light shielding film such as a black matrix is provided at the side of the counter substrate 20. In other words, it is sufficient that at least the counter electrode 21 and the orientation film are provided at the side of the counter substrate 20. Therefore, for example, the liquid crystal device 100 can be manufactured easily in the embodiment in comparison with a case where the light reflection portion 210 and the light shielding film such as the black matrix are provided at the side of the counter substrate 20. Accordingly, reduction in the number of processings in the manufacturing process and improvement in yield can be realized.

Further, particularly in the embodiment, the TFTs 30 and the light reflection portions 210 are arranged so as to overlap with each other when seen from above on the TFT array substrate 10. Therefore, light toward the TFTs 30 from one substrate surface 10s1 side of the TFT array substrate 10 can be blocked by the light reflection portions 210. That is, a light shielding property with respect to the TFTs 30 can be enhanced by the light reflection portions 210. Accordingly, a light leakage current of the TFTs 30 can be reduced and a contrast ratio of the display image can be improved.

In addition, particularly in the embodiment, the TFTs 30 are arranged on the light reflection portions 210 through the light shielding films 211 and are not arranged in the grooves 210v constituting the light reflection portions 210 formed on the TFT array substrate 10. Therefore, the opening region D1 at each pixel can be suppressed from being narrower by the groove 210v in the embodiment in comparison with a case where the TFTs 30 are arranged in the grooves 210v formed on the TFT array substrate 10. Therefore, light transmittance at each pixel can be enhanced.

Further, particularly in the embodiment, each light reflection portion 210 has the air layer 210a in the groove 210v as described above. Therefore, light incident onto the non-opening region D2 from the substrate surface 10s1 side of the TFT array substrate 10 can be reliably reflected on the interface between the air layer 210a of the light reflection portion 210 and the TFT array substrate 10 so as to travel to the opening region D1 at each pixel. Further, with this configuration, the manufacturing process can be simplified in comparison with a case where the grooves 210v are filled with a reflective material such as a metal, for example.

It is to be noted that each light reflection portion 210 may have a vacuum layer in the groove 210v in place of the air layer 210a. In this case, the light incident onto the non-opening region D2 from the substrate surface 10s1 side of the TFT array substrate 10 can be reliably reflected on the interface between the vacuum layer of the light reflection portion 210 and the TFT array substrate 10 so as to travel to the opening region D1 at each pixel. Further, the manufacturing process can be simplified in comparison with a case where the grooves 210v are filled with a reflective material such as a metal, for example.

Further, particularly in the embodiment, the TFTs 30 are formed on the flattened light shielding films 211. Therefore, the element characteristics of the TFTs 30 can be suppressed or prevented from changing by the light reflection portions 210 provided at a lower layer side of the TFTs 30.

As described above, with the liquid crystal device 100 according to the embodiment, light transmittance at each pixel and a light shielding property with respect to the TFTs 30 can be enhanced. As a result, a luminous image with high definition can be displayed.

Next, a method of manufacturing the liquid crystal device according to the above embodiment is described with reference to FIG. 6 through FIG. 9.

FIG. 6 through FIG. 9 are processing views illustrating each processing in a manufacturing process of the liquid crystal device according to the embodiment. FIG. 6 through FIG. 9 are shown so as to correspond to the cross-sectional view as shown in FIG. 4. It is to be noted that processings of forming constituent components (for example, light reflection portions 210, TFTs 30, and the like) at the side of the TFT array substrate 10 of the liquid crystal device according to the above embodiment are mainly described, hereinafter.

Figure 6:
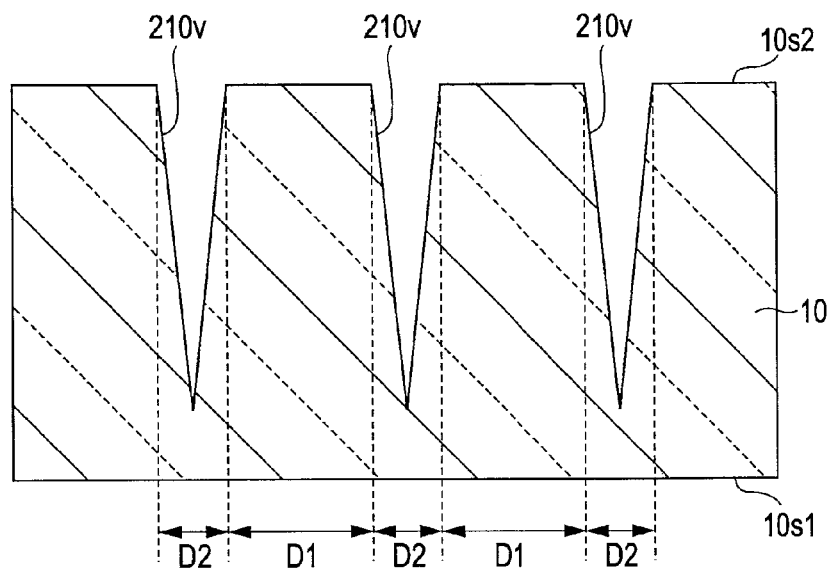
FIG. 6 is a processing view illustrating each processing in a manufacturing process of the liquid crystal device according to the first embodiment (case 1).

At first, in a processing as shown in FIG. 6, the V-shaped grooves 210v are formed in the non-opening regions D2 on the substrate surface 10s2 of the TFT array substrate 10 made of a glass substrate or the like by dry etching, for example. In this case, the grooves 210v are formed to overlap with the non-opening regions D2 (see, FIG. 5) having a grid-form plane shape. That is, the grooves 210v are formed so as to separate the opening regions D1 of the pixels from each other. In other words, the grooves 210v are formed so as to surround the opening region D1 of each pixel.

Figure 7:
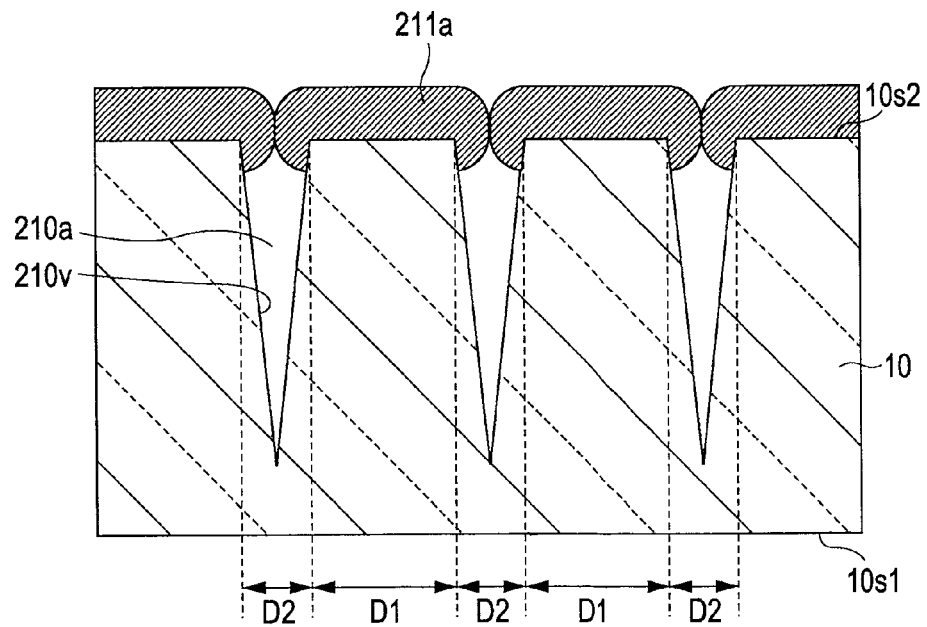
FIG. 7 is a processing view illustrating each processing in the manufacturing process of the liquid crystal device according to the first embodiment (case 2).

Next, in a processing as shown in FIG. 7, a metal material having a high melting point and a light shielding property, such as WSi or W, is deposited on the substrate surface 10s2 of the TFT array substrate 10 by a chemical vapor deposition (CVD) method or the like, for example. With this, a light shielding film 211a as a precursor film of the light shielding film 211 (see, FIG. 4) is formed. In this case, the light shielding film 211a is formed under a film deposition condition (for example, under the CVD condition) such that the grooves 210v are not completely filled with the light shielding film 211a. With this, the light reflection portions 210 having the air layers 210a are formed in the grooves 210v.

Figure 8:
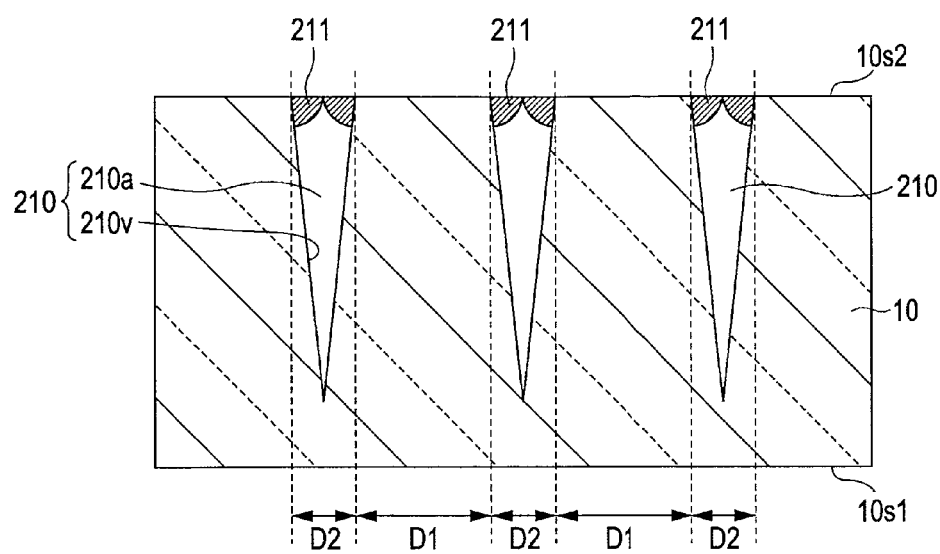
FIG. 8 is a processing view illustrating each processing in the manufacturing process of the liquid crystal device according to the first embodiment (case 3).

Next, in a processing as shown in FIG. 8, the light shielding films 211 of which upper layer surface sides are flattened are formed by subjecting the light shielding film 211a to the flattening processing such as a CMP processing or the like.

Figure 9:
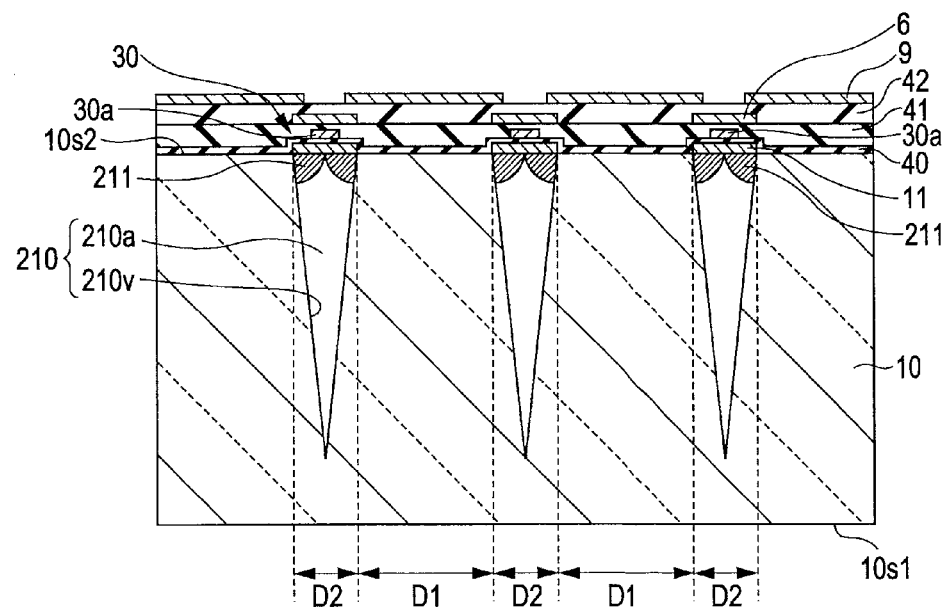
FIG. 9 is a processing view illustrating each processing in the manufacturing process of the liquid crystal device according to the first embodiment (case 4).

Next, in a processing as shown in FIG. 9, the scanning lines 11, the semiconductor layers 30a and the data lines 6 are formed on the non-opening regions D2. To be more specific, the scanning lines 11 are formed on the light shielding films 211 so as to extend in the X direction (see, FIG. 1, FIG. 3 and FIG. 5). Subsequently, the insulation film 40 is formed so as to cover the substrate surface 10s2 of the TFT array substrate 10. Then, each of the semiconductor layers 30a is formed so as to overlap with at least a part of the scanning line 11 (a portion functioning as a gate electrode of the TFT 30) on the non-opening region D2 when seen from above on the TFT array substrate 10. Thereafter, the insulation film 41 is formed so as to cover the substrate surface 10s2 of the TFT array substrate 10. Then, the data lines 6 are formed on the insulation film 41 so as to extend in the Y direction (see, FIG. 1, FIG. 3 and FIG. 5).

The TFTs 30 are formed by forming the scanning lines 11, the semiconductor layers 30a and the data lines 6 in such a manner. With this, particularly in the embodiment, each TFT 30 is formed so as to overlap with each light reflection portion 210 when seen from above on the TFT array substrate 10. Therefore, light from the substrate surface 10s1 side of the TFT array substrate 10 toward the TFT 30 can be blocked by the light reflection portion 210. Accordingly, a light shielding property with respect to the TFT 30 can be enhanced.

In the processing as shown in FIG. 9, after the data lines 6 are formed, the insulation film 42 is formed so as to cover the substrate surface 10s2 of the TFT array substrate 10. Subsequently, the pixel electrode 9 is formed with a transparent material such as ITO for each pixel on the insulation film 42.

Then, the TFT array substrate 10 on which the TFTs 30, the pixel electrodes 9, and the like are formed, and the counter substrate 20 on which the counter electrode 21 is formed are arranged such that the pixel electrodes 9 and the counter electrode 21 are opposed to each other through the liquid crystal layer 50 and bonded to each other with a sealing material, for example.

In such a manner, the liquid crystal device 100 according to the embodiment can be manufactured. Particularly in the embodiment, the light reflection portions 210 are formed not at the side of the counter substrate 20 but at the side of the TFT array substrate 10. Therefore, reduction in an aperture ratio due to relative positional deviation between the TFT array substrate 10 and the counter substrate 20 can be prevented. The relative positional deviation may be caused if the light reflection portion 210 and a light shielding film such as the black matrix are provided at the counter substrate 20 side.

Second Embodiment

A liquid crystal device according to the second embodiment is described with reference to FIG. 10.

FIG. 10 is a cross-sectional view illustrating configurations of a plurality of pixel portions which are adjacent to each other in the liquid crystal device according to the second embodiment. It is to be noted that in FIG. 10, the same reference numerals as those in the first embodiment as shown in FIG. 1 through FIG. 9 denote the same constituent components and the description thereof is appropriately omitted. Further, in FIG. 10, the configuration at the side of the TFT array substrate 10 is shown and configurations at the side of the liquid crystal layer 50 and the counter substrate 20 are not shown.

In FIG. 10, a liquid crystal device 100b according to the second embodiment is different from the liquid crystal device 100 according to the above first embodiment in the following points. That is, the liquid crystal device 100b according to the second embodiment includes light reflection portions 220 in place of the light reflection portions 210 in the above first embodiment and the light shielding films 211 in the above first embodiment are not provided. Other constituents are substantially the same as those of the liquid crystal device 100 according to the above first embodiment.

The light reflection portions 220 according to the second embodiment are different from the light reflection portions 210 according to the above first embodiment in the following point. That is, each light reflection portion 220 has a metal layer 221 in the groove 210v in place of the air layer 210a. Other constituents are substantially the same as those of the light reflection portion 210 according to the above first embodiment.

Particularly in the embodiment, each light reflection portion 220 has a metal layer 221 in the groove 210v. The metal layer 221 is made of a metal having a high melting point and a light reflection property, for example. Therefore, light incident onto the non-opening region D2 from the substrate surface 10s1 side of the TFT array substrate 10 can be reliably reflected on the interface between the metal layer 221 of the light reflection portion 220 and the TFT array substrate 10 so as to travel to the opening region D1 at each pixel. Further, leakage of air from each groove 210v due to the change in ambient atmospheric pressure can be reduced. The leakage of air may be caused in the manufacturing process when each light reflection portion 220 has an air layer in the groove 210v. Accordingly, the reliability of the device can be enhanced. It is to be noted that the metal layer 221 may be made of a metal having a relatively low melting point such as aluminum. In this case, it is sufficient that the TFT 30 is formed as a low-temperature poly silicon (LTPS) TFT.

The metal layer 221 in the embodiment is provided so as to fill the light reflection portion 220 and covers the opening of the groove 210v. Further, the upper surface portion of the metal layer 221 is flattened in the same manner as in the light shielding film 211 according to the first embodiment and functions as a flattened film which reduces a step height between the groove 210v and portions where the groove 210v is not provided.

Third Embodiment

A liquid crystal device according to the third embodiment is described with reference to FIG. 11.

FIG. 11 is a cross-sectional view illustrating configurations of a plurality of pixel portions which are adjacent to each other in the liquid crystal device according to the third embodiment. It is to be noted that in FIG. 11, the same reference numerals as those in the first embodiment as shown in FIG. 1 through FIG. 9 denote the same constituent components and the description thereof is appropriately omitted. Further, in FIG. 11, the configuration at the side of the TFT array substrate 10 is shown and configurations at the side of the liquid crystal layer 50 and the counter substrate 20 are not shown.

In FIG. 11, a liquid crystal device 100c according to the third embodiment is different from the liquid crystal device 100 according to the above first embodiment in the following points. That is, the liquid crystal device 100c according to the third embodiment includes light reflection portions 230 in place of the light reflection portions 210 in the above first embodiment and an insulation film 43 is included in place of the light shielding films 211 in the above first embodiment. Other constituents are substantially the same as those of the liquid crystal device 100 according to the above first embodiment. It is to be noted that the insulation film 43 is an example of "flattened film" according to the invention.

Each light reflection portion 230 according to the third embodiment has an air layer 230a in the groove 210v. The air layer 230a is formed by closing the substrate surface 10s2 side of the groove 210v with the insulation film 43. To be more specific, the air layer 230a is formed in the groove 210v by filling the substrate surface 10s2 side of the groove 210v with a part 43a of the insulation film 43.

The insulation film 43 is provided between the light reflection portions 230 and the TFTs 30 in the laminated structure on the TFT array substrate 10. The insulation film 43 fills at least a part of each of the grooves 210v and the upper surface side thereof is flattened by a flattening processing such as the CMP, for example. Therefore, element characteristics of the TFTs 30 formed on the insulation film 43 can be suppressed or prevented from changing by the light reflection portions 230.

Electronic Apparatus

Next, cases where the above-described liquid crystal device, which is an electrooptical device, is applied to various types of electronic apparatuses are described.

Figure 12:
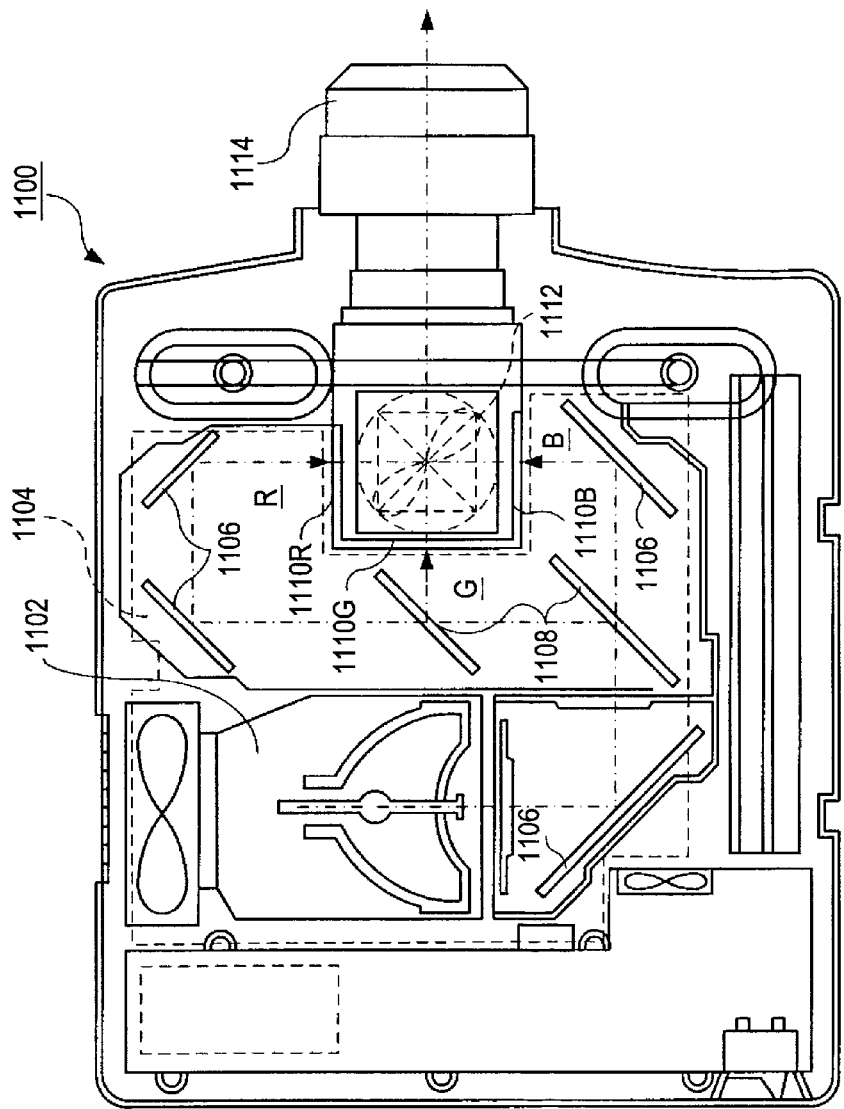
FIG. 12 is a plan view illustrating a configuration of a projector as an example of an electronic apparatus to which an electrooptical device is applied.

At first, a projector using the liquid crystal device as a light bulb is described. FIG. 12 is a plan view illustrating a configuration example of the projector. As shown in FIG. 12, a lamp unit 1102 formed by a white light source such as a halogen lamp is provided in a projector 1100. A projection light which is projected from the lamp unit 1102 is separated into three primary colors of RGB by four mirrors 1106 and two dichroic mirrors 1108. The four mirrors 1106 and the two dichroic mirrors 1108 are arranged in a light guide 1104. Then, the separated projection lights are incident onto liquid crystal panels 1110R, 1110B, 1110G as light bulbs corresponding to each primary color.

Configurations of the liquid crystal panels 1110R, 1110B and 1110G are the same as the above liquid crystal device. The liquid crystal panels 1110R, 1110B and 1110G are driven by the primary color signals of R, G and B, which are supplied from an image signal processing circuit. Then, lights modulated by these liquid crystal panels are incident onto a dichroic prism 1112 from three directions. In the dichroic prism 1112, lights of R and B are deflected by 90° while light of G goes straight. Accordingly, when images of each color are combined, a color image is projected on a screen or the like through a projecting lens 1114, as a result.

Paying attention to a dispay image by the liquid crystal panels 1110R, 1110B and 1110G, a display image by the liquid crystal panel 1110G is required to be right/left inverted with respect to a display image by the liquid crystal panels 1110R, 1110B.

It is to be noted that light corresponding to each primary color of R, G or B is incident onto each of the liquid crystal panels 1110R, 1110B and 1110G by the dichroic mirrors 1108 so that any color filter is not required to be provided.

In addition to the electronic apparatus which has been described with reference to FIG. 12, a mobile personal computer, a mobile phone, a liquid crystal television, a view finder-type or direct monitoring-type video tape recorder, a car navigation system, a pager, an electronic organizer, a calculator, a word processor, a workstation, a videophone, a POS terminal, a device including a touch panel, and the like are exemplified. Then, it is needless to say that the liquid crystal device can be applied to these various types of electronic apparatuses.

The invention is not limited to the above embodiments and can be appropriately changed in a range without departing from the scope or the spirit of the invention derived from the aspects of the invention or the entire specification. Further, an electrooptical device including such change and an electronic apparatus including the electrooptical device are also encompassed within the technical range of the invention.

The entire disclosure of Japanese Patent Application No. 2009-285306, filed Dec. 16, 2009 is expressly incorporated by reference herein.

What is claimed is:

1. An electrooptical device, comprising:
a device substrate having a first face and a second face, the first face opposing the second face;
at least one pixel electrode provided on at least a first portion of the device substrate;
a light reflection portion formed with a groove on a second portion of the device substrate;
a flat film provided to cover at least an opening face of the groove at a side of the first face, the groove having a groove face and the opening face, the groove face crossing the opening face; and
a semiconductor element provided on the flat film, to correspond to the pixel electrode and to overlap with the light reflection portion in a plan view,
wherein the semiconductor element opposes to the light reflection portion via the flat film,
wherein the light reflection portion reflects incident light from the second face to a side of the first face,
wherein the groove has a V shape, and
wherein the pixel electrode overlaps the groove in plan view.

2. The electrooptical device according to claim 1, wherein the flat film fills at least a part of the groove.

3. The electrooptical device according to claim 1, wherein the light reflection portion has an air layer in the groove.

4. The electrooptical device according to claim 1, wherein the light reflection portion has a vacuum layer in the groove.

5. The electrooptical device according to claim 1, wherein the light reflection portion has a metal layer in the groove.

6. The electrooptical device according to claim 1, further comprising a counter substrate opposed to the device substrate,
wherein the at least one pixel electrode includes a plurality of pixel electrodes, and
wherein the counter substrate is free of a light shielding film at a position corresponding to an area between the pixel electrodes which are adjacent to each other on the device substrate.

7. An electronic apparatus, comprising the electrooptical device according to claim 1.

8. An electrooptical device, comprising:
a first substrate having a first surface and a second surface, the second surface opposing to the first surface;
a second substrate;
an electrooptical material disposed between the first substrate and the second substrate;
a pixel electrode that covers a first portion of the first substrate;
a light reflection portion that is configured to reflect incident light entered into the first substrate from the second surface to a side of the first surface; and
a semiconductor element that covers a second portion of the first substrate,
wherein the semiconductor element opposes to the light reflection portion via a shielding part, the shielding part is disposed at the side of the first surface of the first substrate,
wherein the light reflection portion includes a V shaped groove of the first substrate, and
wherein the pixel electrode overlaps the V shaped groove in plan view.

9. The electrooptical device according to claim 8, wherein the first substrate includes a groove portion, and
the light reflection portion is the groove portion of the first substrate.

10. The electrooptical device according to claim 8, wherein the first substrate includes a groove portion, and
the light reflection portion includes a metal layer disposed in the groove portion of the first substrate.

11. The electrooptical device according to claim 8, wherein:
the semiconductor element covers the light reflection portion; and
the light reflection portion is disposed on the second portion of the first substrate.

12. An electrooptical device, comprising:
a first substrate having a first surface and a second surface, the second surface opposing to the first surface;
a pixel electrode that covers a first portion of the first substrate;
a light reflection portion that is configured to reflect incident light entered into the first substrate from the second surface to a side of the first surface; and
a semiconductor element that covers a second portion of the first substrate, wherein the semiconductor element opposes to the light reflection portion via a shielding part, the shielding part is disposed at the side of the first surface of the first substrate, wherein the light reflection portion includes a V shaped groove of the first substrate, and wherein the pixel electrode overlaps the V shaped groove in plan view.

* * * * *